UNITED STATES PATENT OFFICE 2,421,163

PURIFICATION OF 1-1'-5'-1''-TRIANTHRIMIDE-2-2'-6'-2''-DICARBAZOLE

Mario Scalera, Somerville, N. J., assignor to American Cyanamid Company, New York, N. Y., a corporation of Maine No Drawing. Application October 16, 1943, Serial No. 506,553

6 Claims. (Cl. 260—318)

This invention relates to a new method of purifying the orange anthraquinone vat dyestuff 1,1',5'1''-trianthrimide-2,2',6'2''-dicarbazole.

This dyestuff which has been known for many years is usually prepared from 1,1'5',1''-trianthrimide by ring closure with aluminum chloride at elevated temperature with or without the use of solvents. When first produced the dyestuff was quite impure and was originally described as an orange-brown dyestuff. Soon a method of purification of the dyestuff was developed using an oxidizing agent such as an aqueous solution of sodium hypochlorite with or without previous acid pasting of the product. Considerable purification was effected, as the color of the dyestuff was brightened to a yellow-orange and it was thought that the dyestuff was substantially pure.

The improvement which constitutes the present invention was developed after an observation that the dyestuff, even after treatment with an oxidizing agent, is not a pure compound but a mixture of two compounds both of which are resistant to the action of aqueous sodium hypochlorite. One component is the desired dyestuff having the formula:

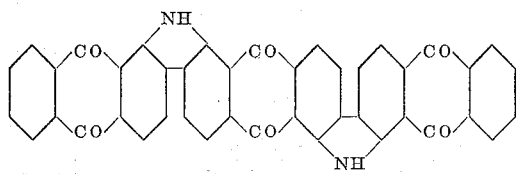

The other is found to contain chlorine and I believe it to be a monochlorinated 1,1'-dianthrimide-2,2'-monocarbazole. According to the present invention I have found that these two compounds may be separated by treatment with concentrated sulfuric acid, preferably at higher temperatures. The trianthrimide-dicarbazole is sparingly soluble in sulfuric acid of 95–98% concentration and in this dilute solution it is of a pure blue color, having an absorption maximum at 630 millimicrons. It is virtually insoluble in organic solvents such as nitro benzene, even at the boiling point, and dyes cotton from a red-brown vat bright pure orange shades of unexcelled fastness. The chlorinated compound is quite readily soluble in sulfuric acid of the same strength, forming red-violet solutions with an absorption maximum of 510 millimicrons. The compound is also difficultly soluble in nitro benzene at the boiling point and dyes cotton a dull brownish-yellow shade of good fastness from a brown vat.

It is not intended to limit my invention to any particular theory of structure or formation of the chlorinated impurity. That it is a monochloro-monocarbazole is shown by analysis, and I believe that it is produced by a side reaction in which the aluminum chloride used for ring closure breaks one of the imide linkages of the trianthrimide. Even when starting with chlorine-free trianthrimide 25–50% of the product is of the chlorine containing byproduct.

According to the present invention the chlorine containing byproduct is removed from the dicarbazole by extracting with concentrated sulfuric acid, preferably for a considerable time at elevated temperatures. The insoluble sulfate of the pure dicarbazole is recovered by filtration from the resulting slurry. This extraction appears to remove substantially all of the chlorinated impurity as the extracted dicarbazole does not show any change in shade on further treatment with sulfuric acid, and the acid extract shows the pure blue color of the dicarbazole sulfate.

While it is an advantage of the present invention that the temperature at which extraction is carried out is not critical I prefer to use elevated temperatures from 100–110° C. with 98% sulfuric acid, maintaining the extraction for periods up to 24 hours. The possibility of purifying by hot sulfuric acid extraction is all the more surprising since the mixture was formerly considered to be sensitive to the action of concentrated sulfuric acid, and in the past acid pasting was recommended at temperatures below 5° C. Any sensitivity which may have existed must have been due to the chlorinated impurity.

It is an advantage that the process of the present invention may be applied to a very crude mixture of the dicarbazole with the chlorinated impurity such as is obtained from a fusion with aluminum chloride and a product of excellent properties can be obtained even from this highly impure starting material. However, when the crude product is purified by the process of the present invention it is desirable to subject the product to an after treatment with aqueous sodium hypochlorite. On the other hand a very effective modification of the present invention applies the sulfuric acid treatment to the dyestuff obtained by treating the crude product with oxidizing agents. In this case no subsequent treatment with hypochlorite is necessary, particularly if the sulfate presscake is well washed with concentrated sulfuric acid.

Crude dyestuffs obtained by condensation with other halides such as ferric chloride may also be subjected to purification by the process of the present invention. In every case the purified product dissolves in concentrated sulfuric acid to form a pure blue solution instead of a violet solution and dyes cotton goods a redder and brighter orange shade.

The invention will be described in greater detail in connection with the specific examples. The parts are by weight.

*Example 1*

To a slurry of 1,800 parts of aluminum chloride in 1,800 parts of trichlorobenzene, preheated to 150° C., there is gradually added an intimate blend of 300 parts of 1,1',5',1'' trianthrimide of the formula:

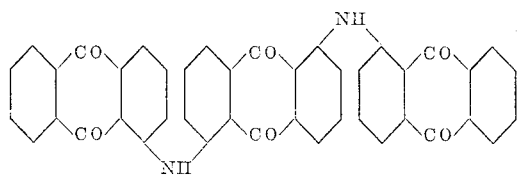

and 150 parts of soda ash. After the addition is complete, the resulting slurry is held at 155° to 160° for 1 hour longer, poured into 10,000 parts of water and filtered. The filter cake is washed, freed from trichlorobenzene with steam and filtered again.

The product is then suspended in water and the suspension treated with a solution of sodium hypochlorite at 80-90° C., until the solution shows a permanent test to starch iodide paper. The slurry is then brought to a boil, filtered, washed free of chlorides and dried. There are obtained 260 parts of an orange powder, which dyes cotton from the vat dull orange shades.

125 parts of the dyestuff thus obtained are suspended in 1875 parts of 98% sulfuric acid. The suspension is agitated for 2 hours at 120° C., allowed to cool, and filtered.

The residue is washed on the filter with 98% sulfuric acid until the washings come through pure blue, as contrasted to the original filtrate which is violet. The light yellow-brown cake, consisting of very small flat crystals, is taken up in water, forming a bright orange slurry. This is filtered and washed free of acid.

The dyestuff thus obtained is resistant to oxidation with hypochlorite, being recovered substantially unchanged, and in quantitative yield, after treatment for ½ hour with a solution of sodium hypochlorite (5% available chlorine) at 90-95° C. It dyes cotton in clean, bright yellow-orange shades which are substantially redder and brighter than those obtained with the starting material. It dissolves slightly in 98% sulfuric acid with a pure blue color.

If the filtrate of 98% sulfuric acid is drowned in water there is obtained a brown product which, after filtering and washing, can be oxidized by means of sodium hypochlorite in aqueous suspension to an orange dye with considerable yield loss. This dyes cotton in rather dull, brownish yellow shades. It dissolves readily in sulfuric acid of 98% strength with a red-violet color. In the pure state it is fairly resistant to hypochlorite oxidation, a finely dispersed aqueous suspension thereof being recovered in 81% yield, and substantially unaltered in shade, after treating it for 30 minutes with sodium hypochlorite (5% available chlorine) at 90-95° C.

The method of preparation of the crude dyestuff described above is that of the copending application, Serial No. 506,572, of G. M. Smyth and J. F. Cullinan, filed October 16, 1943. Substantially the same results are obtained when the crude dyestuff is prepared by other known ring closure methods, such as for instance with aluminum chloride alone, or with aluminum chloride-sodium chloride, or aluminum chloride-pyridine, or with analogous agents such as ferric chloride.

*Example 2*

140 parts of dyestuff (obtained as described in the first two paragraphs of the preceding example) are added to 1400 parts of 98% sulfuric acid at 120° C. The slurry is agitated at 100–120° C. for 20 hours. It is allowed to cool and is filtered.

The yellow-brown filter cake is washed with 360 parts of 98% sulfuric acid, in portions. The filter cake is dispersed in water, giving a bright orange slurry which is filtered, washed free of acid, and dried. The filtrate of 98% sulfuric acid is drowned into a large volume of water, giving a black slurry, which is filtered and dried.

The two fractions are obtained in approximately equal yields, each weighing 67 to 69 parts.

20 parts of the pure, sparingly soluble dicarbazole component obtained above are slurried in 200 parts of 98% sulfuric acid at 120°, and the resulting, thick black slurry is stirred at 100°–120° for 20 hours. The slurry is cooled and filtered. The filter cake and the acid filtrate are separately drowned in water and freed from acid as described above.

There are obtained from the filter cake 18 parts of pure orange dyestuff, practically unchanged by this second extraction; and from the filtrate 1.5 parts of dark brown dyestuff, similar to the more soluble fraction described above.

The same recovery, of approximately 90%, is obtained if the process is repeated a third time, indicating the 10% loss to be due to slight solubility of the dicarbazole and to partial decomposition.

*Example 3*

100 parts of crude dyestuff (obtained as described in the first paragraph of Example 1, not purified by oxidation) is suspended in 1,500 parts of 98% sulfuric acid, and the slurry is agitated at 100°–120° C. for 18 hours. The resulting slurry is allowed to cool and filtered.

The filter cake is dispersed in water, giving a dark brown suspension, which is filtered, washed free of acid. It is reslurried in 500 parts of water, and a solution of sodium hypochlorite (15% available chlorine) is added at 80°–90° until the chlorine is no longer absorbed, as indicated by a permanent test to starch iodide. The slurry is boiled, the orange residue is filtered and washed free of inorganic salts.

The dyestuff thus obtained is substantially identical to that described in Examples 1 and 2. The filtration from the concentrated sulfuric acid, however, is considerably more sluggish when using the crude dyestuff. It may be considerably accelerated by the use of diatomaceous earth filter aid (40 to 100 parts) during the filtration.

*Example 4*

An intimate mixture of 200 parts of 1,1',5',1''-trianthrimide, 150 parts of soda ash, and 50 parts of meta nitrobenzene potassium sulfonate is added slowly, at 150° C., to 1400 parts of aluminum chloride suspended in 1400 parts of trichlorobenzene. There is a temperature rise of 20° C. during the addition, which may be conveniently carried out over 30 to 60 minutes. The slurry is held at 150° for 30 mins. longer, then it is poured out into water and filtered. The filter cake, after removing the trichlorobenzene with steam, is dried.

The crude dyestuff (210 parts, contains aluminum) is dissolved in 3,000 parts of 98% sulfuric acid at 120° C., stirred for 2 hours, and then drowned into water. The light brownish yellow slurry is filtered, the filter cake washed free of acid and treated in aqueous suspension with sodium hypochlorite liquor in small portions at 80°–90° C. until chlorine is no longer reduced. About 250 to 300 parts of chlorine lye (15% available chlorine) are needed for this purpose. The bright orange slurry is filtered, the cake washed and dried. Yield, 145 parts of bright orange product, which dyes cotton in rather dull, reddish yellow shades, and dissolves in concentrated sulfuric acid with a bluish purple color.

This product is purified as follows:

The dyestuff is suspended in 2,000 parts of 98% sulfuric acid, heated for 7 hours at 120° C. and filtered. The residue is washed on the filter with 200 parts of 98% sulfuric acid, in portions, and then with water. If necessary, it may be further purified by treatment with aqueous sodium hypochlorite solution.

There is obtained 100 to 110 parts of pure dicarbazole dyestuff, which dyes cotton clear orange shades of outstanding fastness from a red brown vat, and dissolves with a blue color in concentrated sulfuric acid.

I claim:

1. A method of separating 1,1′,5′,1″-trianthrimide-2,2′,6′,2″-dicarbazole from monochlorinated-1,1′-dianthrimide-2,2′-carbazole, which comprises slurrying the mixture with sulfuric acid of over 95% by weight, the amount of acid being sufficient to convert the products into the sulfates and to dissolve the sulfate of the monochlorinated dianthrimide carbazole and separating, without dilution, the sparingly soluble sulfate of the dicarbazole from the solution of the sulfate of the monochlorodianthrimide carbazole.

2. A method according to claim 1 in which the extraction is effected at 100–110° C.

3. A method of separating 1,1′,5′,1″-trianthrimide-2,2′,6′,2″-dicarbazole from a chlorine containing byproduct, which comprises slurrying the reaction products of 1,1′,5′,1″-trianthrimide with aluminum chloride with sulfuric acid of over 95% by weight, the amount of acid being sufficient to convert the products into the sulfates and to dissolve the sulfate of the chlorine containing byproduct, and separating without dilution the sparingly soluble sulfate of the dicarbazole from the solution of the sulfate of the chlorine containing byproduct.

4. A method of separating 1,1′,5′,1″-trianthrimide-2,2′,6′,2″-dicarbazole from a chlorine containing byproduct, which comprises slurrying the reaction products of 1,1′,5′,1″-trianthrimide with aluminum chloride in the presence of an oxidizing agent with sulfuric acid of over 95% by weight, the amount of acid being sufficient to convert the products into the sulfates and to dissolve the sulfate of the chlorine containing byproduct, and separating without dilution the sparingly soluble sulfate of the dicarbazole from the solution of the sulfate of the chlorine containing byproduct.

5. A method according to claim 3 in which the extraction with sulfuric acid is effected at 100–110° C.

6. A method according to claim 4 in which the extraction with sulfuric acid is effected at 100–110° C.

MARIO SCALERA.

REFERENCES CITED

The following references are of record in the file of this patent:

UNITED STATES PATENTS

| Number | Name | Date |
|---|---|---|
| 999,798 | Kalischer et al. | Aug. 8, 1911 |
| 1,900,350 | Kranzlein et al. | Mar. 7, 1933 |
| 2,225,302 | Hartwell | Dec. 17, 1940 |
| 2,212,028 | Lulek | Aug. 20, 1940 |
| 2,152,186 | Graham | Mar. 28, 1939 |

FOREIGN PATENTS

| Number | Country | Date |
|---|---|---|
| 238,523 | Great Britain | Sept. 2, 1926 |
| 296,758 | Great Britain | Apr. 25, 1929 |

OTHER REFERENCES

Hackh's Chemical Dictionary—P. Blakiston's Son & Co., Philadelphia, 2nd ed. (1937), pg. 905.